(12) United States Patent
Bergmann et al.

(10) Patent No.: US 8,434,512 B2
(45) Date of Patent: May 7, 2013

(54) ROTATING DISC DILUTER FOR FLUID FLOWS

(75) Inventors: Alexander Bergmann, Graz (AT); Helmut Pongratz, Graz (AT)

(73) Assignee: AVL List GmbH, Graz (AT)

( * ) Notice: Subject to any disclaimer, the term of this patent is extended or adjusted under 35 U.S.C. 154(b) by 1001 days.

(21) Appl. No.: 12/222,805

(22) Filed: Aug. 15, 2008

(65) Prior Publication Data
US 2009/0049934 A1 Feb. 26, 2009

(30) Foreign Application Priority Data

Aug. 16, 2007 (AT) .................................. 491/2007

(51) Int. Cl.
*F16K 11/065* (2006.01)
(52) U.S. Cl.
USPC ................. 137/625.18; 137/625; 251/206
(58) Field of Classification Search .................. 137/625, 137/625.18, 597; 251/206; 73/863.73, 864.83
See application file for complete search history.

(56) References Cited

U.S. PATENT DOCUMENTS

| | | | |
|---|---|---|---|
| 3,476,518 A | | 11/1969 | Jungner |
| 3,964,513 A | * | 6/1976 | Molner ............... 137/624.18 |
| 4,134,425 A | * | 1/1979 | Gussefeld et al. ......... 137/625.3 |
| 4,573,532 A | * | 3/1986 | Blake ........................ 166/264 |
| 4,702,889 A | | 10/1987 | Cabrera et al. |
| 4,957,008 A | | 9/1990 | Proni et al. |
| 5,251,670 A | * | 10/1993 | Bates et al. ............. 137/625.46 |
| 5,601,115 A | * | 2/1997 | Broerman ................... 137/595 |
| 5,650,577 A | | 7/1997 | Nagai et al. |
| 6,155,123 A | * | 12/2000 | Bakalyar ................... 73/864.83 |
| 6,497,136 B2 | * | 12/2002 | Satou .......................... 73/23.22 |
| 2006/0005882 A1 | * | 1/2006 | Tison et al. ................ 137/487.5 |

FOREIGN PATENT DOCUMENTS

JP  11183472  7/1999

OTHER PUBLICATIONS

English Abstract of JP11183472.

* cited by examiner

*Primary Examiner* — John Fox
*Assistant Examiner* — Seth Faulb
(74) *Attorney, Agent, or Firm* — Dykema Gossett PLLC

(57) ABSTRACT

A rotating disc diluter (1) has a rotatable rotary element (4) which carries surface-accessible transfer volumes (9, 10) which along their common path of movement alternately glide over feed and discharge ports (11-18) for an undiluted fluid flow on the one hand and for a dilution fluid flow on the other hand. For the simple widening of the usable dilution rate range, the rotary element (4) has at least two rows of transfer volumes (9, 10) on different paths of movement, the associated feed ports (11-14) of which for the undiluted fluid flow and/or for the dilution fluid flow can be separately controlled.

8 Claims, 3 Drawing Sheets

ROTATING DISC DILUTER FOR FLUID FLOWS

BACKGROUND OF THE INVENTION

1. Field of the Invention

The invention relates to a rotating disc diluter for fluid flows, with a rotatable rotary element which has surface-accessible discrete transfer volumes which along their common path of movement alternately glide over feed and discharge ports for the undiluted fluid flow on the one hand and for a dilution fluid flow on the other hand.

2. The Prior Art

Such arrangements, which are also referred to as carrousel diluters, for example are known from "Journal of Aerosol Science, 1997, Vol. 28, Nr. 6, pages 1049 to 1055" and are mostly used for taking measurements of liquid or gaseous fluid flows and especially when for the better utilization of limited measuring ranges of the measuring devices defined pre-dilutions are required in a dilution rate range which is as large as possible. A basic block of the arrangement which is known from the mentioned literature reference has two connecting passages; one for the undiluted fluid flow (an aerosol-laden gas in that case), and the other for an aerosol-free dilution fluid flow. The two passages have feed and discharge ports on the same outside surface of the basic block and are covered by the rotary element which is driven via a stepper motor and which for reducing the friction consists of synthetic material with corresponding admixtures. The transfer volumes, which are arranged in the rotary element on the side facing the feed and discharge ports, glide over the ports during the rotation of the rotary element and as a result are filled with a controllable portion of the aerosol-laden fluid flow which at the corresponding ports for the dilution fluid flow is then carried along again by this. The dilution ratio is therefore a function of number and volume of the discrete transfer volumes as well as of the dilution fluid volumetric flow and of the rotational speed of the rotary element.

Figure 7:
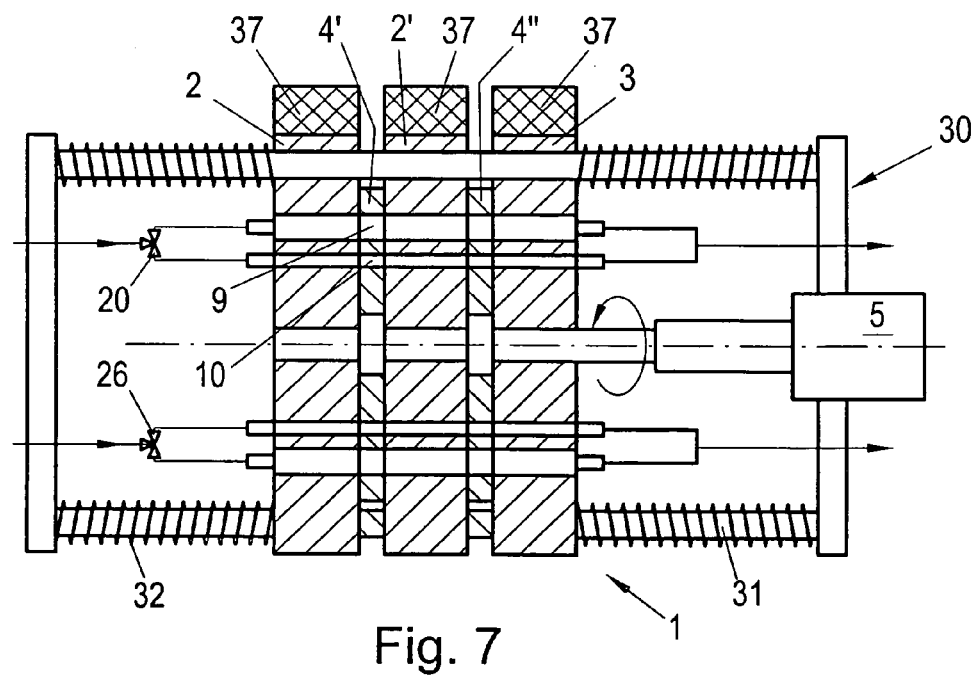

In a constructionally somewhat differently constructed arrangement of the type which is mentioned in the introduction, instead of a rotary element which is provided on one side with cavities, a perforated disc is provided, the continuous transfer volumes of which are filled or emptied in the through-flow direction from the feed port to the discharge port. The supplied aerosol-laden fluid flow is completely freed of the aerosol downstream of the rotary element in a filter and then as a dilution fluid flow is fed to the other side of the rotary element. If the rotary element is stationary, no aerosol-laden partial volume is tapped off and fed on the other side, so that no aerosol remains in the fluid flow which is fed to the measuring device. If the rotary element is rotated, a certain portion of the aerosol-laden fluid flow is again added to the particle-free dilution fluid flow, with which the dilution rate in turn is variable across the same parameters as referred to above.

In the case of the known arrangements of the type mentioned in the introduction, it is disadvantageous that the adjustable dilution rate range is relatively tightly limited and can be shifted up or down only by means of constructional alterations to the interacting elements, but even then can hardly be widened.

It is the object of the present invention to improve a rotating disc diluter of the type mentioned in the introduction so that the mentioned disadvantages of the known arrangements are avoided and so that in a simple manner a significant increase of the usable dilution rate range especially becomes possible.

SUMMARY OF THE INVENTION

This object is achieved according to the present invention in the case of a rotating disc diluter of the type mentioned in the introduction by the rotary element having at least two rows of transfer volumes on different paths of movement, the associated feed ports of which for the undiluted fluid flow and/or for the dilution fluid flow can be separately controlled. As a result, the dilution rate range can be increased in a very simple manner by combination of the different possibilities of control of the different rows of transfer volumes (only one row, a plurality of rows together, or all rows together).

The transfer volumes in each row, in a further development of the invention, are preferably individually of equal size and in the individual separate rows are of different size, with which with a combination of control possibilities of the individual rows an improvement of the grading possibility of the achievable dilution rates is easily possible.

The number of transfer volumes in the individual rows can also be different, which also enables further exertions of influence upon the achievable dilution rates.

The volumetric flow rate of the dilution fluid flow, in a further development of the invention, can be adjusted via an upstream mass flow controller which additionally enables a widening of the usable dilution rate range.

In an especially preferred further development of the invention, the rotary element has at least two separately rotatable sub-elements, which are connected in series in the fluid flow direction, with separate rows of transfer volumes and associated feed and discharge ports, with which the usable dilution rate range is further increased.

The rotatable rotary element and/or the feed and discharge passages to or from the feed and discharge ports, in a further development of the invention can be thermostatized by means of heating elements, preferably internal electric heating cartridges, which prevents or at least greatly reduces accumulations of components of the fluid flow and especially of the aerosols which are transported by this.

The invention will be explained in more detail in the following based on the exemplary embodiments which are represented in the drawings.

BRIEF DESCRIPTION OF THE DRAWINGS

FIG. 1 shows a schematic cross section through a rotating disc diluter according to the invention which is built into an aerosol measuring system, FIG. 2 shows a concrete exemplary embodiment for the essential components, shown by hatching in FIG. 1, of a rotating disc diluter according to the invention in perspective exploded view, FIG. 3 shows a further partially schematically shown exemplary embodiment for a rotating disc diluter according to the invention, FIG. 4 shows a sectional view along the arrows IV, IV in FIG. 3, FIG. 5 shows a view along the arrows V, V in FIG. 3 onto the rotary element of the arrangement according to FIG. 3 alone, FIG. 6 shows a rotating disc diluter which for example is formed according to FIGS. 3 to 5, arranged in a particle measuring system, and FIG. 7 shows a further exemplary embodiment for a rotating disc diluter according to the invention.

DETAILED DESCRIPTION OF THE PREFERRED EMBODIMENTS

Figure 1:
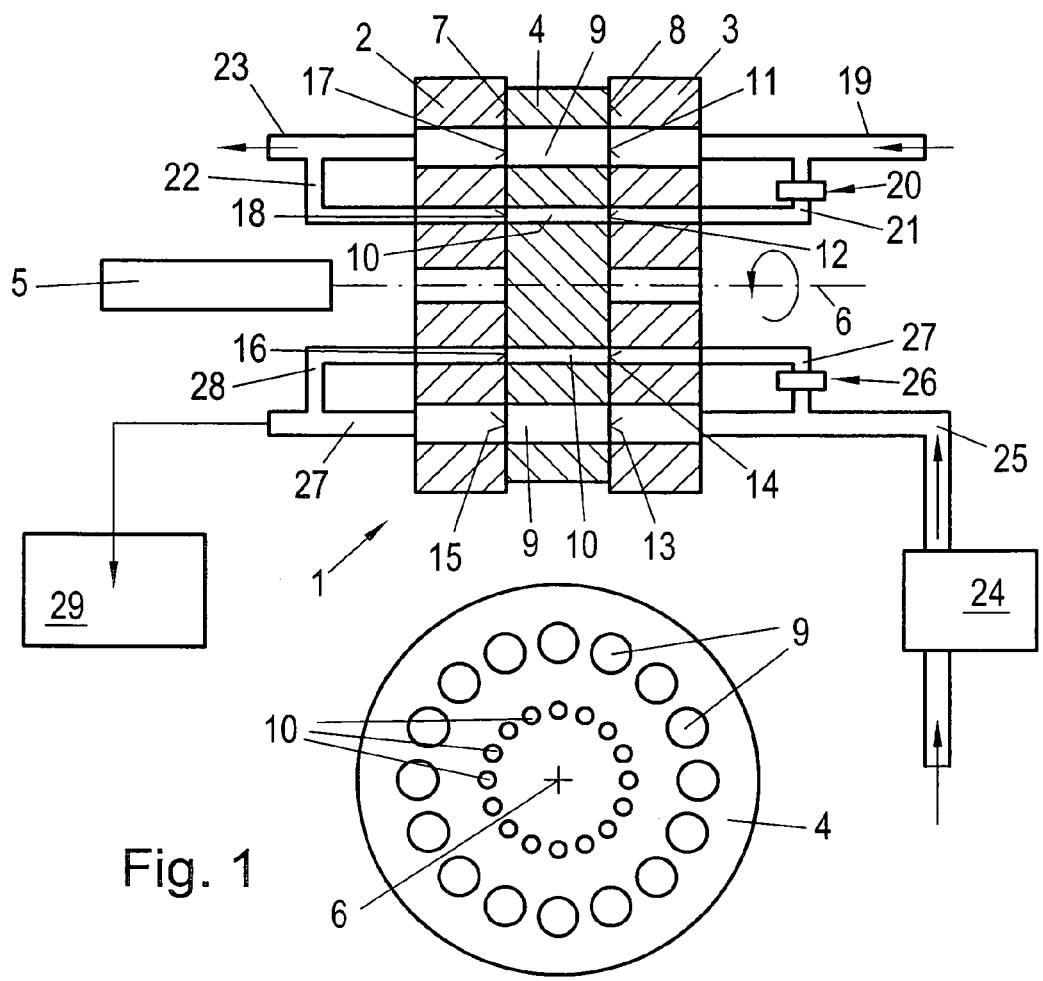

The rotating disc diluter 1 according to FIG. 1 has a rotatable rotary element 4 between two stationary elements 2, 3, which by means of a stepper motor 5 is rotatable around its axis 6, and is provided with discrete transfer volumes 9, 10 which are surface-accessible from both sides 7, 8. As is especially also to be seen from the side plan view, shown separately at the bottom in FIG. 1, of the rotary element 4 (in the direction of the axis 6), two separate rows of transfer volumes (9 on the one hand and 10 on the other hand) are provided in this case, which, during rotation of the rotary element 4 around its axis 6, on two different paths of movement glide in each case alternately over feed and discharge ports 11 to 18 in the sides 7, 8 of the stationary elements 2, 3 which interact with the rotary element 4 with sealing effect.

An undiluted flow fluid (gaseous or even liquid, for example particle-laden exhaust gas of an internal combustion engine) is fed via a line 19. By means of an on-off valve 20 in a branch line 21, the fluid flow which is fed via the line 19 can be selectively fed only to the feed port 11 or else to the two feed ports 11 and 12. Apart from that, however, it could also be arranged to install separately controllable on-off valves 20 in the lines to the two feed ports 11, 12, with which just the feed port 12 would then be controllable via the line 21 when required. On the side of the rotating disc diluter 1 opposite the line 19, the discharge ports 17, 18, via lines 22, 23, lead to an outlet for the fluid flow which is not additionally shown.

Via an upstream mass flow controller 24 and a line 25, on the lower side in the view according to FIG. 1, a controllable dilution fluid flow is fed, which by means of an on-off valve 26 can be fed in a controllable manner to the feed port 13 or to the two feed ports 13, 14 (via the branch line 27). On the opposite side of the rotating disc diluter 1, lines 27, 28 from the discharge ports 15, 16 are provided in turn which feed the diluted fluid flow for example to an aerosol measuring device 29.

Figure 2:
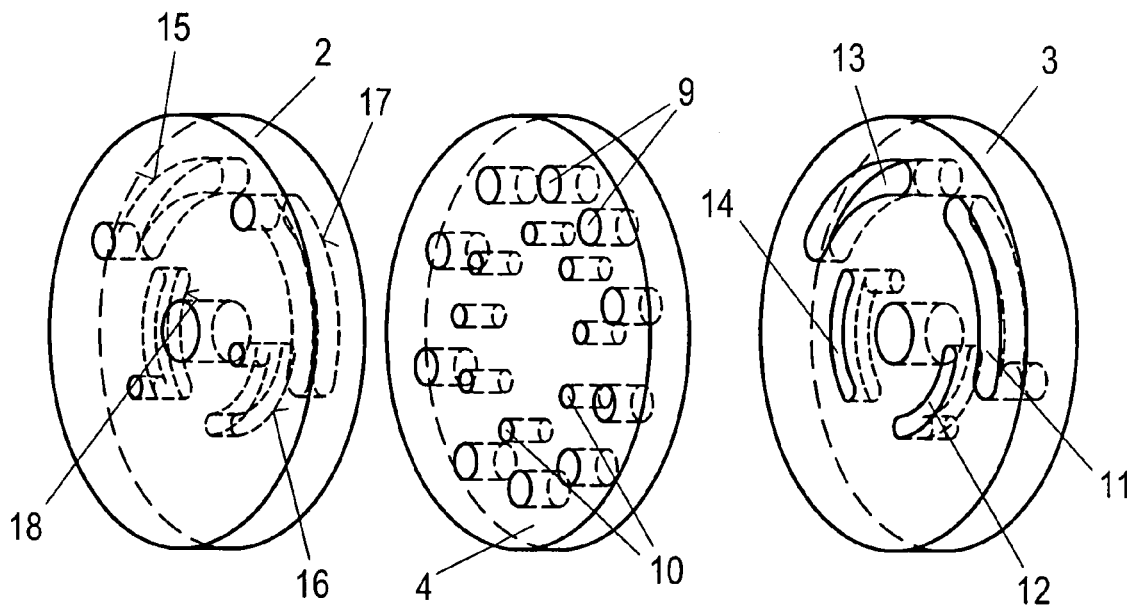

From FIG. 2 it is evident that the feed and discharge ports 11 to 18 in practice extend over a certain circumferential angular region, so that a plurality of the discrete transfer volumes 9 or 10 are continually covered which ensures a better filling or emptying of the transfer volumes 9, 10 during their rotational movement.

If the rotary element 4 according to FIGS. 1 and 2 stops between the stationary elements 2, 3 (without rotation around the axis 6), the fluid flow which is fed via the line 19 gets through the rotating disc diluter 1 through the feed ports 11, or 11 and 12, through the respectively covered transfer volumes 9, 10, through the discharge ports 17, 18 and the line 23, in an unchanged state so that the dilution fluid flow which is fed via the line 19 arrives at the aerosol measuring device 29 in an unchanged state even without any admixing. If the rotary element 4 is rotated, a certain portion of the for example aerosol-laden fluid flow which is fed via the line 19 is added to the per se particle-free dilution fluid flow, with which the dilution ratio is a function of number and volume of the discrete transfer volumes 9, 10, as well as of the dilution fluid volumetric flow and of the rotational speed of the rotary element 4. Since the feed ports 11, 12 for the undiluted fluid flow and 13, 14 for the dilution fluid flow are separately controllable, in a very simple manner the dilution rate range can be increased by combination of the different possibilities of controlling the different rows of transfer volumes 9, 10 (only one row, the two rows or a plurality of rows together, or all the rows together . . . ).

The transfer volumes 9, 10 in each row in this case are individually of equal size and in the two individual separate rows which are shown are of different size. Apart from that, the number of transfer volumes in the individual rows could also be different, which even in the case of transfer volumes of equal size would enable different dilution rates.

Figure 3:
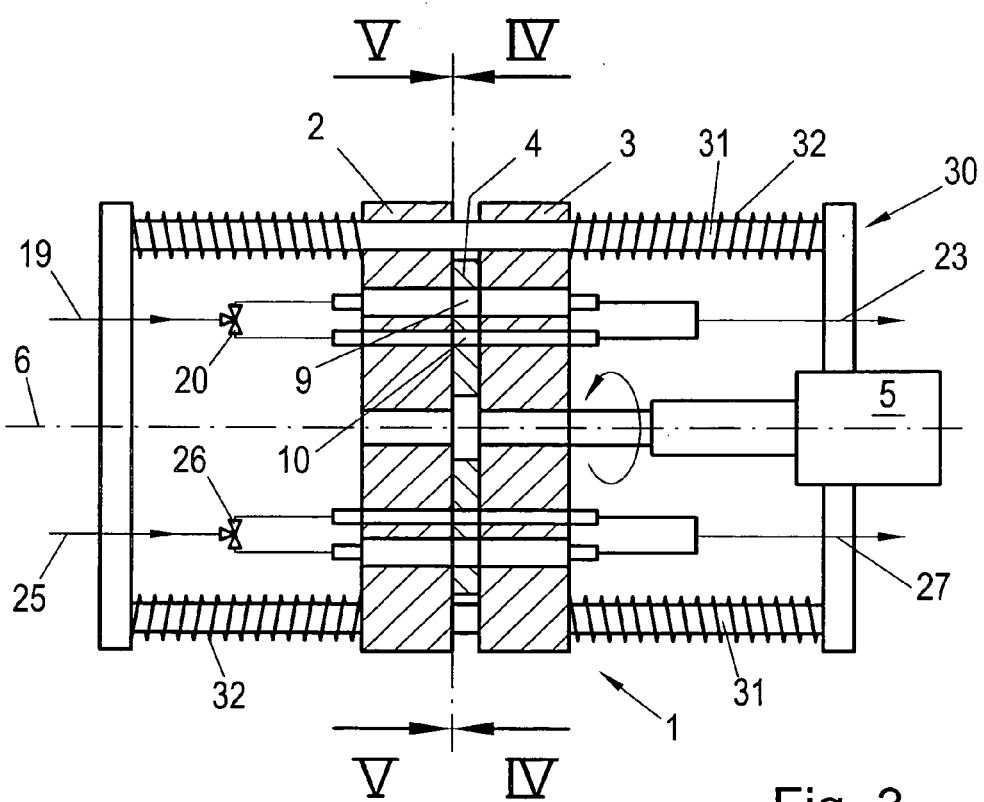
Figure 4:
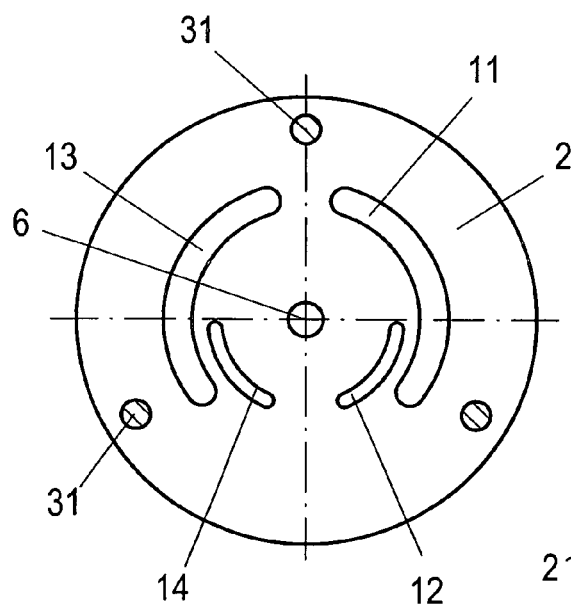
Figure 5:
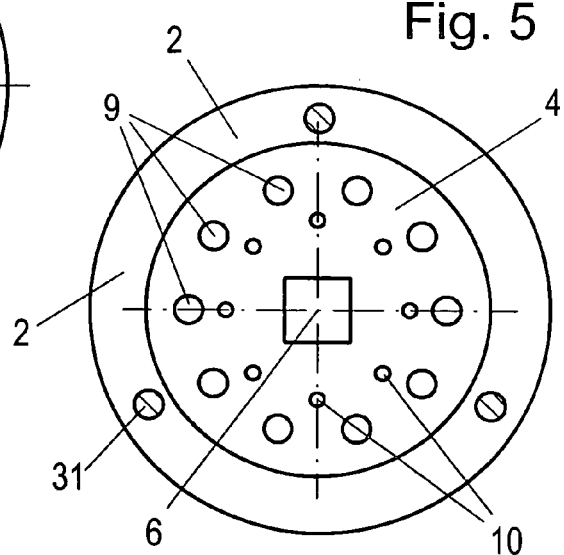

In the case of the arrangement according to FIGS. 3 to 5, parts which from the function correspond to the arrangement according to FIGS. 1 and 2 are identified by the same designations. Apart from the elements and their principle of operation already discussed for FIGS. 1 and 2, a housing frame 30 which supports the stepper motor 5 is to be additionally referred to here, which via three connecting columns 31 and springs 32 which are guided thereupon presses the stationary elements 2, 3 from both sides against the rotary element 4 which is arranged between them. The inlet-side on-off valves 20, 26 which are shown here on the left-hand side, enable a selective or simultaneous charging of the large transfer volumes 9 and/or of the small transfer volumes 10.

Figure 6:
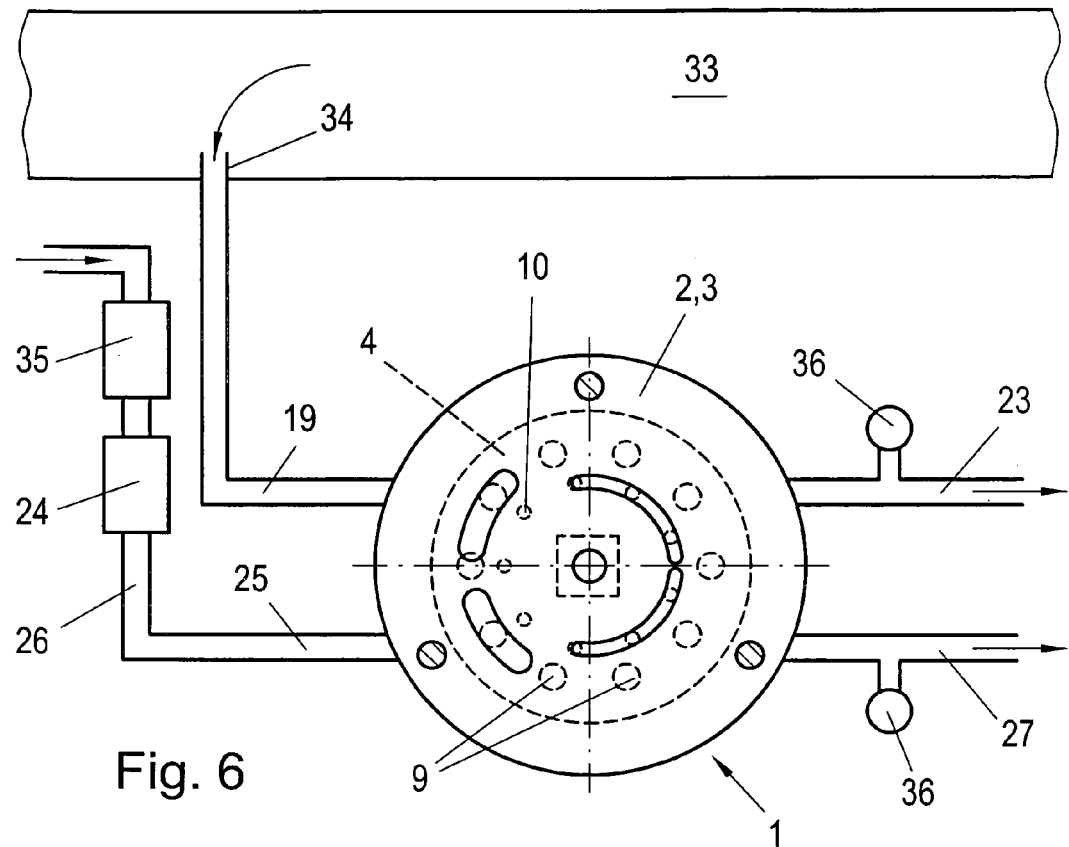

In FIG. 6, the rotating disc diluter 1 from FIGS. 3 to 5 is shown during its interaction with the inlet side of an aerosol measuring device. Particle-laden exhaust gas is extracted from the exhaust pipe 33 of an internal combustion engine by means of a probe 34 and fed to the rotating disc diluter 1 via the line which here again is identified by 19. Particle-free dilution air flows via the line 26, which includes a filter 35 and also the mass flow controller 24, to the rotating disc diluter 1 via the line 25. Exhaust gas flows out via the line 23, and diluted aerosol-laden exhaust gas flows out via the line 27. In this case, pressure sensors 36 are additionally arranged in the two lines 23 and 27 in order to be able to convert the volumes to mass equivalents, by means of the general gas equation, which are necessary for the correct calculation of the dilution rate when using mass flow regulators for the dilution fluid volumetric flow. Temperature influences in this case can be taken into consideration by means of the thermostatizing of the dilution discs which is shown in FIG. 7.

In the case of the rotating disc diluter 1 according to FIG. 7, the rotary element has two separately rotatable sub-elements 4', 4", which are connected in series in the fluid flow direction, with separate rows of transfer volumes 9, 10 and associated feed and discharge ports 11 to 18 in three stationary elements 2, 2', 3, which enables an additional increase of the usable dilution rate range.

In addition, the possibility of heating the stationary elements 2, 2' and 3 via heating elements 37 is also indicated in FIG. 7, with which the feed and discharge passages to or from the feed and discharge ports 11 to 18 can be thermostatized, which also prevents the accumulation for example of aerosols.

The invention claimed is:

1. A rotary disc diluter for fluid flows which comprises:
   a stationary first element providing a plurality of feed ports positioned in at least two rows,
   a stationary second element providing a plurality of discharge ports positioned in at least two rows, and
   a rotatable disc positioned between said first and second elements, said rotatable disc defining at least two rows of passageways therethrough for respective transfer volumes of feed and dilution fluid supplied thereto from respective feed ports in said first element, said passageways aligning with respective feed and discharge ports of said first and second elements as said disc is rotated, with at least one feed port of each row of feed ports of said stationary first element and at least one discharge port of each row of discharge ports of said stationary second element communicating with a plurality of respective passageways of each respective row of passageways in said rotatable disc at the same time, enabling separate control of feed and dilution fluid flows through said diluter.

2. The rotating disc diluter according to claim 1, wherein each of said passageways of each of said at least two rows of passageway have equal sizes, whereas passageways of individual separate rows are of different size.

3. The rotating disc diluter according to claim 1, wherein the number of passageways in individual rows is different.

4. The rotating disc diluter according to claim 1, including a mass flow controller for controlling volumetric flow of dilution fluid flow to said first element.

5. The rotating disc diluter according to claim 1, wherein the rotary element has at least two separately rotatable sub-elements which are connected in series in the fluid flow direction, with separate rows of transfer passageways and associated feed and discharge ports.

6. The rotating disc diluter according to claim 1, including heating elements for heating the rotatable rotary element and/or feed and discharge passages to or from the feed and discharge ports.

7. The rotary disc diluter according to claim 1, wherein the passageways of two of said at least two rows of passageways are positioned in concentric arrays.

8. The rotary disc diluter according to claim 7, wherein said feed ports of said first element and said discharge ports of said second element are respectively located in concentric arrays and are elongated along on arc.

\* \* \* \* \*